US 6,723,790 B2

(12) United States Patent
Brandenburg et al.

(10) Patent No.: US 6,723,790 B2
(45) Date of Patent: Apr. 20, 2004

(54) BLENDS OF POLY[α-METHYLENELACT(ONE)(AM] HOMO- AND COPOLYMERS

(75) Inventors: Charles J. Brandenburg, Wilmington, DE (US); David M. Dean, West Chester, PA (US); George Henry Hofmann, Wilmington, DE (US); Rutger D. Puts, Wilmington, DE (US); Edmund A. Flexman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/886,075

(22) Filed: Jun. 21, 2001

(65) Prior Publication Data
US 2002/0028881 A1 Mar. 7, 2002

Related U.S. Application Data
(60) Provisional application No. 60/213,074, filed on Jun. 21, 2000, and provisional application No. 60/259,975, filed on Jan. 5, 2001.

(51) Int. Cl.[7] .................. C08L 51/00; C08L 39/04; C08L 37/00
(52) U.S. Cl. .................. 525/73; 525/74; 525/186; 525/203; 525/205; 525/206
(58) Field of Search .................. 525/73, 74, 186, 525/203, 205, 206

(56) References Cited

U.S. PATENT DOCUMENTS

| 3,678,133 A | 7/1972 | Ryan |
| 3,793,402 A | 2/1974 | Owens |
| 3,808,180 A | 4/1974 | Owens |
| 3,985,703 A | 10/1976 | Ferry et al. |
| 4,180,494 A | 12/1979 | Fromuth et al. |
| 4,543,383 A | 9/1985 | Heil et al. |
| 4,753,980 A | 6/1988 | Deyrup |
| 5,625,001 A | 4/1997 | Makower et al. |
| 5,880,235 A | 3/1999 | Schwind et al. |
| 5,998,554 A | 12/1999 | Yokoo |

FOREIGN PATENT DOCUMENTS
| WO | WO 99/12986 A1 | 3/1999 |

OTHER PUBLICATIONS

Arnoldi, D., Dorn, K., Schwind, H., Hasskerl, T., and Hauch, D., Hanau; Kunststoffe 87, 1997, #6, pp. 734–736.

*Primary Examiner*—Ana Woodward
(74) *Attorney, Agent, or Firm*—Inna Y. Belopolsky

(57) ABSTRACT

Polymers containing α-methylenelact(ones)(ams) such as α-methylenebutyrolactones are useful in blends with other polymers. For examples such polymers which have reactive groups are toughened by mixing with a rubbery material which has complimentary reactive groups, or polymers containing repeat units derived from α-methylenelact(ones)(ams) are toughened by mixing with polymeric core-shell particles having an elastomeric core and a specified thermoplastic shell. The properties of thermoplastics are also improved by blending with α-methylenelact(ones)(ams) such as α-methylenebutyrolactones containing (co)polymers.

19 Claims, No Drawings

BLENDS OF POLY[α-METHYLENELACT(ONE)(AM] HOMO- AND COPOLYMERS

FIELD OF THE INVENTION

Polymers containing repeat units derived from α-methylenelact(ones)(ams) such as α-methylenebutyrolactones and which have reactive groups are toughened by mixing with a rubbery material which has complimentary reactive groups, or polymers containing repeat units derived from α-methylenelact(ones)(ams) are toughened by mixing with polymeric core-shell particles having an elastomeric core and a specified thermoplastic shell; or blends of polymers containing repeat units derived from α-methylenelact(ones)(ams) with thermoplastics often yield compositions which have a higher modulus and/or heat deflection temperature than the thermoplastic alone.

TECHNICAL BACKGROUND

Thermoplastics comprise a large body of commercially important products. Among the uses of thermoplastics are those in which the optical properties of the polymer are important, particularly when the polymer is an optically clear material with little distortion of optical images. Such polymers, for example poly(methyl methacrylate) (PMMA) and certain polycarbonates are used as substitutes for glass where toughness is important. In uses such as for safety glazing and signage, other properties such as weather and/or heat resistance may also be important. For example if such a part needed to be thermally sterilized, it must withstand the temperature of the sterilization process. Polycarbonates often have poor weathering and/or hydrolysis resistance, while PMMA has a relatively low glass transition temperature (Tg), so its heat resistance is poor. Thus polymers with a combination of good optical properties, and heat and weathering resistance are desired.

The polymers of certain α-methylenelact(ones)(ams) (AMLs) have the combination of good properties, but often are quite brittle, see for instance U.S. Pat. No. 5,880,235, and the discussion at columns 1–3, and D. Arnoldi, et al., Kunststoffe, vol. 87, p. 734–736 (1997). Thus if one could toughen these polymers without compromising their other superior properties, useful compositions would result.

While the toughening of AMLs using toughening agents is in the Applicant's knowledge not reported in the literature, toughening of thermoplastics in general using toughening agents is known. For example, poly(meth)acrylates have been toughened by a number of methods, see for instance U.S. Pat. Nos. 5,625,001 and 5,998,554, and World Patent Application 99/12986.

Tougheners for various types of engineering resins [including (meth)acrylics] and other polymers are sold by Rohm and Haas Co., Philadelphia, Pa, U.S.A. under the tradename Paraloid®, such as their EXL™ series which is believe to be a core-shell polymeric particle product with a rubber core and thermoplastic shell, and also see for instance U.S. Pat. Nos. 3,678,133, 3,793,402, 3,808,180, 3,985,703, 4,180,494, and 4,543,383.

Other types of thermoplastics have been toughened by the addition of elastomeric polymers which contain reactive groups such as epoxides, see for instance U.S. Pat. No. 4,753,980.

Conversely, AMLs may be used to improve the properties of thermoplastics, including thermoplastics containing functional groups which potentially may react with the AML.

Such thermoplastics include polyamides, polyesters, and polyacetals, and nonfunctional group containing thermoplastics such as styrene/acrylonitrile copolymers. It is believed that to be most effective in improving properties, the AML should be dispersed within a matrix of the thermoplastic. Polymer-polymer blends of various polymers are well known in the art, but to Applicants' knowledge, no blends of AMLs with other polymers have been reported.

SUMMARY OF THE INVENTION

This invention concerns a first composition, comprising:
(a) a first polymer comprising the repeat units:
  (i) at least about 10 mole percent of the total repeat units of

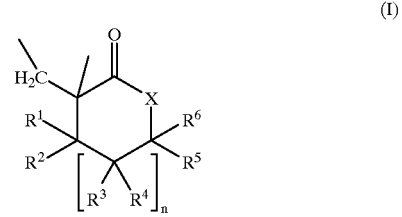

(I)

(ii) at least about 0.1 mole percent of a repeat unit containing a first reactive functional group;
  (iii) up to about 89.9 mole percent of repeat units derived from one or more monomers which are free radically copolymerizable with (a)(i) and (a)(ii); and
(b) about 1 weight percent to about 50 weight percent based on the total weight of (a) and (b), of a second polymer which is elastomeric and contains a second reactive functional group which may react with said first reactive functional group;
or
(c) a third polymer comprising the repeat units
  (i) at least about 10 mole percent of the total repeat units of

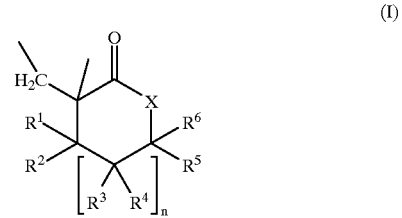

(I)

(ii) up to about 90 mole percent of repeat units derived from one or more monomers which are free radically copolymerizable with (b)(i); and
(d) about 1 percent by weight to about 60 percent by weight based on the total weight of (c) and (d), of a fourth polymer which is core-shell particles made up of an elastomeric polymer core and a polymeric thermoplastic shell, said thermoplastic shell comprising repeat units derived from methyl methacrylate wherein:
  n is 0, 1 or 2;
  X is —O— or —NR$^9$—; and
  R$^1$, R$^2$, R$^5$, R$^6$, each of R$^3$, and each R$^4$, are independently hydrogen, a functional group, hydrocarbyl or substituted hydrocarbyl; and
  R$^9$ is hydrogen, hydrocarbyl or substituted hydrocarbyl.

This invention also concerns a second composition, comprising:
  (e) a fifth polymer comprising the repeat units:
    (i) at least about 10 mole percent of the total repeat units of

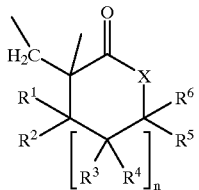

(I)

(ii) optionally a repeat unit containing a third reactive functional group;
    (iii) up to about 90 mole percent of repeat units derived from one or more monomers which are free radically copolymerizable with (e)(i), and (e)(ii), if present; and
  (f) a sixth polymer which is a thermoplastic and which may optionally contain one or more fourth reactive functional groups which may react with said third functional group;
  provided that in said composition (b) is present as a continuous or cocontinuous phase and (a) is present as a dispersed or cocontinuous phase;
  and wherein:
    n is 0, 1 or 2;
    X is —O— or —$NR^9$—; and
    $R^1$, $R^2$, $R^5$, $R^6$, each of $R^3$, and each $R^4$, are independently hydrogen, a functional group, hydrocarbyl or substituted hydrocarbyl; and
    $R^9$ is hydrogen, hydrocarbyl or substituted hydrocarbyl.

DETAILS OF THE INVENTION

Certain terms are used herein as defined below.

By "hydrocarbyl group" is meant a univalent group containing only carbon and hydrogen. If not otherwise stated, it is preferred that hydrocarbyl groups (and alkyl groups) herein contain 1 to about 30 carbon atoms.

By "substituted hydrocarbyl" is meant a hydrocarbyl group which contains one or more substituent groups which are inert under the process conditions to which the compound containing these groups is subjected. The substituent groups also do not substantially interfere with the process. If not otherwise stated, it is preferred that substituted hydrocarbyl groups herein contain 1 to about 30 carbon atoms. Included in the meaning of "substituted" are heteroaromatic rings. In substituted hydrocarbyl all of the hydrogens may be substituted, as in trifluoromethyl.

By "functional group" is meant a group other than hydrocarbyl or substituted hydrocarbyl which is inert under the process conditions to which the compound or polymer containing the group is subjected. The functional groups also do not substantially interfere with any process described herein that the compound or polymer in which they are present may take part in. Examples of functional groups include halo (fluoro, chloro, bromo and iodo), ether such as —$OR^{22}$ wherein $R^{22}$ is hydrocarbyl or substituted hydrocarbyl.

By "reactive functional group" is meant a functional group that may react with another functional group present in the process or composition. By "may react" is meant that the functional group may react with its counterpart reactive group, but it is not necessary that such reaction happen or that all of the reactive functional groups react with one another. Usually in the formation of the compositions described herein some fraction of these reactive functional groups will react.

By "copolymerizable under free radical conditions" is meant that the (potential) monomers, preferably vinyl monomers, involved are known to copolymerize under free radical polymerization conditions. The free radicals may be generated by any of the usual processes, for example thermally from radical initiators such as peroxides or azonitriles, by UV radiation using appropriate sensitizers, and by ionizing radiation. The copolymerization may be done in any number of known ways, for example bulk, solution, suspension, or aqueous suspension or emulsion, or combinations of methods such as bulk-suspension. These polymers may be prepared by various types of processes, such as continuous, batch and semibatch, which are well known in the art. Many combinations of free radically copolymerizable monomers are known, see for instance J. Brandrup, et al., Ed., Polymer Handbook, 4$^{th}$ Ed., John Wiley & Sons, New York, 1999, p. II/181-II/308.

By "elastomeric or rubbery polymer" is meant a polymer having a flexural modulus (of unfilled pure elastomeric polymer) of 35 MPa or less when measured by ASTM D790, and not having a Tg above 30° C., preferably not having a Tg above 0° C. Glass transition temperatures are measured by ASTM D3418 at a heating rate of 20° C./min and the Tg is taken as the midpoint of the transition.

In the first, third and fifth polymers herein, (I) is present as a repeat unit. (I) is derived from the monomer

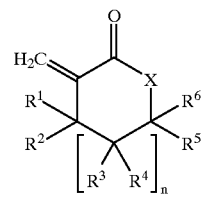

(III)

wherein X and $R^1$ through $R^6$ and $R^9$ are as defined above.
In preferred structures (I) and (III):
  n is 0; and/or
  $R^1$, $R^2$, $R^3$, $R^4$, $R^5$ and $R^6$ are hydrogen or alkyl containing 1 to 6 carbon atoms, more preferably all are hydrogen; and/or
  X is —O— or —$NR^9$— wherein $R^9$ is hydrogen or alkyl containing 1 to 6 carbon atoms, more preferably X is —O—.

In particularly preferred structures for (I) and (III), n is 0, X is —O— and $R^1$, $R^2$, $R^5$ and $R^6$ are hydrogen, or n is 0, X is —O—, $R^6$ is methyl, and $R^1$, $R^2$ and $R^5$ are hydrogen. For other preferred structures of (I) and (III) see U.S. Pat. No. 5,880,235, which is hereby included by reference, at column 4, line 44 to column 8, line 59.

In the first polymer (I) is at least about 10 mole percent of the repeat units present, preferably at least about 20 mole percent, more preferably at least about 50 mole percent. The repeat unit (a)(ii) in the first polymer has a functional group which is reactive (with a functional group in the second polymer). Useful functional groups in repeat unit (a)(ii) are epoxy, carboxylic anhydride, isocyanato, hydroxyl, carboxyl, and primary and secondary amino. Repeat units containing these functional groups may be derived from maleic acid or anhydride (for carboxylic anhydride) or from functional (meth)acrylates of the formula

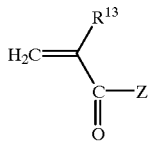
(IV)

wherein $R^{13}$ is hydrogen or methyl and Z may be (for example) —OH, —OCH$_2$CH$_2$OH, —N(CH$_3$)CH$_2$CH$_2$NH$_2$, and

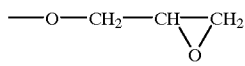

In a preferred repeat unit (a)(ii) Z is —OH (acrylic or methacrylic acid) and it is even more preferred if $R^{13}$ is methyl (methacrylic acid). Preferably the level of repeat unit (a)(ii) is about 0.1 to about 25 mole percent, more preferably about 1 to about 10 mole percent, of the total repeat units. In another preferred repeat unit (a)(ii) Z is —CH$_2$CH$_2$OH (2-hydroxyethyl methacrylate or 2-hydroxyethyl acrylate), more preferably in this compound $R^{13}$ is methyl (2-hydroxyethyl methacrylate).

In the fifth polymer a repeat unit (e)(ii) containing a third reactive functional group may be present. This repeat unit may be derived from monomers listed above for repeat unit (a)(ii), and be present at the same levels preferred for (a)(ii). It is also to be noted that in the fifth polymer it is possible that repeat units derived from (I) may also react with the fourth functional group. These are not considered to be repeat unit of the type (e)(ii) but of type (e)(i). For example the lactone ring of a (e)(i) may open and react with a functional group of (e)(iii).

In the first, third and fifth polymers additional repeat units (a)(iii), (c)(ii), and (e)(iii), respectively, may also be present. Preferably these repeat units have the formula

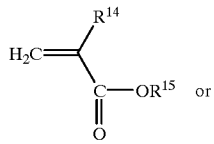
(V)

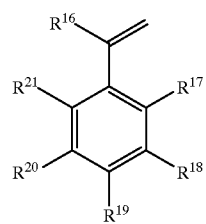
(VI)

wherein $R^{14}$ is hydrogen or methyl, and $R^{15}$ is hydrocarbyl or substituted hydrocarbyl, preferably alkyl, and $R^{16}$ is hydrogen or methyl and $R^{17}$, $R^{18}$, $R^{19}$, $R^{20}$ and $R^{21}$ are each independently hydrogen, hydrocarbyl substituted hydrocarbyl or a functional group. In a preferred structure (V) $R^{14}$ and $R^{15}$ are both methyl (methyl methacrylate), and in a preferred structure (VI) $R^{16}$, $R^{17}$, $R^{18}$, $R^{19}$, $R^{20}$ and $R^{21}$ are all hydrogen (styrene).

In a particularly preferred first or fifth polymer, 0 to about 40 mole percent of the repeat units present are derived from methyl methacrylate, and 0 to about 5 mole percent of the repeat units are derived from an alkyl acrylate wherein the alkyl group has 2–4 carbon atoms, more preferably ethyl acrylate or n-butyl acrylate. In a particularly preferred third polymer, 0 to about 40 mole percent of the repeat units present are derived from methyl methacrylate, and 0 to about 5 mole percent of the repeat units are derived from an alkyl acrylate wherein the alkyl group has 2–4 carbon atoms, more preferably ethyl acrylate or n-butyl acrylate. The second polymer is elastomeric, or a core-shell polymer wherein the second reactive functional group is in the shell portion of the polymer, and amount of functional as described below refer to the amount of second functional group in the core portion of the core-shell polymer only. The core-shell polymers are similar to those described below for the fourth polymer, except have a functional group in the shell. Such functional groups may be incorporated for example by copolymerizing a functional monomer such as a hydroxyethyl (meth)acrylate or glycidyl (meth) acrylate into the shell. Preferably the shell of this core-shell polymer also comprises repeat units derived from methyl methacrylate.

Generally speaking the first, third and fifth polymers may be mixed in any proportion with one or more other type(s) of polymer(s) to form a polymer blend. The other polymer(s) may be an elastomer (with or without functional groups), and/or a thermoplastic. The elastomer may or may not be crosslinked. It is preferred that in such blends there be a continuous phase and a dispersed phase. Depending on the composition of the blend and its desired properties, the first third or fifth polymers may be the dispersed or continuous phases, and the other polymer(s) present would be in the complementary phase. Preferably the first third and fifth polymers are 1 to 99 volume percent of the blend and the other polymer(s) are 99 to 1 volume percent of the blend. Preferred first third and fifth polymers for these general types of blends are the same as described above for the first third and fifth polymers.

The second polymer has a second reactive functional group which may react with the first reactive functional group of the first polymer. Table 1 below gives some useful functional groups and some of the corresponding functional groups with which they may react. Either functional group of these reactive pairs may be present in the first polymer and the other functional group present in second polymer.

TABLE 1

| Functional Group | Complimentary Functional Group |
|---|---|
| carboxyl | amino, hydroxyl |
| epoxy | hydroxyl, amino, carboxyl |
| carboxylic anhydride | hydroxyl, amino |
| isocyanato | hydroxyl, amino, carboxyl |

In one particularly preferred combination of first and second polymers the first polymer contains carboxyl or hydroxyl groups, especially preferably derived from methacrylic acid, in the case of carboxyl groups, and from a hydroxyalkyl (meth)acrylate, especially 2-hydroxyethyl methacrylate, in the case of hydroxy groups, and the second polymer contains epoxy groups. A particularly preferred second polymer is an elastomeric copolymer of ethylene, an alkyl (particularly those having 1–8 carbon atoms) acrylate and glycidyl acrylate or methacrylate, particularly glycidyl methacrylate.

Such copolymers are described in U.S. Pat. No. 4,753,980, which is hereby included by reference. For example such a copolymer may contain 40–90 weight percent ethylene repeat units, 10–40 weight percent of an alkyl acrylate or methacrylate, and 0.5–20 weight percent of glycidyl acrylate or methacrylate. Another type of second polymer which is useful is an elastomeric polymer on which a compound containing an appropriate functional group has been grafted, for example an ethylene/propylene (EP) or ethylene/propylene/diene (EPDM) rubber grafted with maleic anhydride. Preferably the second polymer contains about 0.01 to about 1.5 moles, more preferably about 0.03 moles to about 1.0 moles of the second reactive group per kg of second polymer.

The fourth polymer is in the form of so-called core-shell particles. These are polymer particles, often made in suspension or emulsion polymerization, which have a core of one polymer, and a shell (outer layer) of another polymer. These polymers are well known, and known to be useful for the toughening of various thermoplastics, see for instance U.S. Pat. Nos. 3,678,133, 3,793,402, 3,808,180, 3,985,703, 4,180,494, and 4,543,383, all of which are hereby included by reference. For the elastomeric core various types of elastomers may be used, for example poly-1,3-butadiene, poly(meth)acrylic esters and their various copolymers, EPDM, and other polymers. Preferred core materials are poly(1,3-butadiene-co-styrene), and various elastomeric acrylate copolymers, for example those containing one or more of ethyl acrylate, n-butyl acrylate, and 2-ethylhexyl acrylate. For the thermoplastic shell various (meth)acrylic polymers may be used, but poly(meth)acrylic esters and their copolymers are preferred. A preferred shell material is PMMA or a copolymer of methyl methacrylate which is at least 50 weight percent methyl methacrylate. The core and/or shell may be crosslinked in various ways, for example by using difunctional monomers in relatively small amounts to form crosslinks. It is preferred that the shell portion of the particle be relatively thin, so that at least about 50 percent by volume of the average particle is elastomeric (core) polymer.

The sixth polymer may have fourth functional groups which are complimentary to the third reactive functional groups, in an analogous manner to the first and second reactive functional groups above.

Polymers containing (I) may be made by the free radical (co)polymerization of (III), see for instance U.S. Pat. No. 5,880,235 and references cited therein. When (I) is present in a copolymer, it tends to raise the Tg of most copolymers. For example in a copolymer of (III) with methyl methacrylate, the Tg will normally be above the Tg of a PMMA homopolymer.

In the first composition some of the toughened polymers described herein are transparent when visually viewed, see for instance Examples 2 and 5. It is believed the toughening agents used in these examples have refractive indices very close to the polymer being toughened.

When the two (or more) polymers of the first composition are mixed, it is preferred that the second polymer be uniformly dispersed in the first polymer, or the fourth polymer be uniformly dispersed in the third polymer. It is preferred that the discontinuous phase (second or fourth polymers) be of relatively small particle size, typically in the range of 0.01–10 μm. This can be achieved in high shear melt mixers such as single and especially twin-screw extruders, or other types of melt mixers.

In the second composition herein a sixth polymer, a thermoplastic, is present in a blend with a fifth polymer, which is a homo- or copolymer of (I), preferably a copolymer of (I). By "thermoplastic" is meant the usual meaning, a polymer which contains crystallites at 30° C. which have a heat of fusion of 1 J/g or more, or whose glass transition temperature is greater than 30° C. when measured by ASTM D3418 at a heating rate of 20° C./min and the Tg is taken as the midpoint of the transition. Useful thermoplastics include polyesters such as poly(ethylene terephthalate) and poly (butylene terephthalate), polyamides such as nylon-6,6 and nylon-6, polyolefins such as polyethylene and polypropylene, liquid crystalline polymers including polyesters and poly(ester-amides), other vinyl addition polymers such as polystyrene and poly(styrene-co-acrylonitrile), polyacetals, polycarbonates and poly(meth)acrylates such as poly(methyl methacrylate). Preferred sixth polymers are polyamides, especially nylon-6 and nylon-6,6, polyester, especially poly(ethylene terephthalate) and poly(butylene terephthalate), and polyacetals especially polyoxymethylene. In the second composition the fifth polymer is preferably present as dispersed particles. The sixth polymer is preferably present as a continuous phase. This phase relationship is most readily obtained when the major portion of the polymer blend by volume is the sixth polymer and the minor portion is the fifth polymer (based on the total volume of fifth and sixth polymers present). Preferably the fifth polymer is about 5 to about 70 weight percent. More preferably, from about 20 to about 50 weight percent.

The second composition can be most readily made by melt mixing the fifth and sixth polymers in an apparatus such as a single or twin screw extruder that imparts sufficient shear to the mixture to disperse the fifth polymer in the sixth polymer. It is believed that this dispersion takes place in many instances relatively easily compared to making other similar polymer blends because the fifth polymer (whether or not it contains deliberately introduced reactive functional groups) reacts with many of the sixth polymers which may be used, for example by opening of some of the lactone rings.

All of the compositions herein may additionally comprise other materials commonly found in thermoplastic compositions, such as fillers, reinforcing agents, dyes, pigments, antioxidants, and antiozonants. These materials may be present in conventional amounts, which vary according to the type(s) of material(s) being added and their purpose in being added.

EXAMPLES

In the Examples the following abbreviations are used:

AIBN—azobis(isobutyronitrile)
n-BA—n-butyl acrylate
DAM—dry as made
DMA—dynamic mechanical analysis
DMAC—N,N-dimethylacetamideDMSO-dimethylsulfoxide
E—elongation
E'—storage modulus
F.M.—flexural modulus
GBL—γ-butyrolactone
GPC—gel permeation chromatography
HDT—heat deflection temperature
HEMA—2-hydroxyethyl methacrylate
LCP—liquid crystalline polymer
MBL—α-methylenebutyrolactone
MMA—methyl methacrylate Mn—number average molecular weight
Mw—weight average molecular weight
NMP—N-methylpyrrolidone
PBT—poly(butylene terephthalate)
PET—poly(ethylene terephthalate)
POM—polyoxymethylene(polyacetal)
SAN—styrene/acrylonitrile copolymer
TEM—transmission electron microscopy
Tg—glass transition temperature
T.S.—tensile strength MMA and AIBN were obtained from Aldrich Chemical Co., Milwaukee, Wis., U.S.A. Paraloid® EXL-3361 and BTA 730L were obtained from Rohm & Haas Co., Philadelphia, Pa., U.S.A. γ-Butyrolactone (GBL) for the polymerization solvent was obtained from Spectrum Chemical Co., New Brunswick, N.J., U.S.A. Polyoxymethylene (POM, molecular weight 65,000), polybutylene terephthalate (PBT, I.V.=1.2), polyethylene terephthalate (PET, I.V.= 0.65), liquid crystalline polyester (LCP, melt viscosity 52 Pa·s@350° C.@1000 $s^{-1}$) and nylon 6,6 (molecular weight 16,500) were obtained from E. I. DuPont de Nemours & Co., Inc., Wilmington, Del., U.S.A. Styrene acrylonitrile (SAN, melt flow (230° C./3.8 kg)-8.7 g/10 min) was obtained from Dow Chemical Co, Midland, Mich., U.S.A. Nylon 6 (molecular weight 20,600) was obtained from Allied Signal, Morristown, N.J., U.S.A. Polycarbonate (melt flow @300° C./1.2 kg, ASTM D1238 is 3.5 g/10 min) was obtained from GE Plastics, Pittsfield, Mass., U.S.A. The Notched Izod testing was carried out according to ASTM D256 on specimens about 3.2 mm thick. Haze and transmission were measured according to ASTM D1003. Molecular weight was determined by triple detector GPC with 2 Showdex® 80M columns, a Waters® 410 RI detector and a Viscotek® T60A light scattering and viscometry detector. The solvent was hexafluoroisopropanol and 0.01 M sodium triflate as the solvent and using Zytel® 101 as a standard. Blending in a Brabender® mixer was done in a Brabender® Electronic Plasticorder®, Model EPL-5502 0236/SE from C. W. Brabender Instruments, S. Hackensack, N.J., U.S.A.

For Examples 12 to 22 melt mixing was carried out with a 16 mm twin screw extruder, Welding Engineers Model TSE 16TC with a 3.2 mm die and 60 kPa of vacuum on port no. 3, and was operated at 150 rpm. The screw had three sets of partial conveying kneading blocks without reverse elements. Alternatively a twin screw extruder, model ZSK-30 manufactured by Werner-Pfleiderer was used utilizing a screw having two kneading blocks followed by a reverse element.

Glass transition temperatures were measured by ASTM D3418 at a heating rate of 20° C./min and the Tg is taken as the midpoint of the transition.

The flexural modulus was measured by ASTM D790.

The Tensile strength and % elongation was measured according to ASTM D638.

Heat deflection temperature was determined according to ASTM D648 at 1.82 MPa load.

TEM was carried by sectioning molded plaques or pieces by cryo-ultramicrotomy. Sections of a nominal thickness 90 nm were accumulated in cold ethanol, transferred to water and retrieved on copper mesh grids. For blends containing SAN, PBT or PET, the grids were exposed to $RuO_4$ vapor for 2 h. Samples with Nylon were stained overnight by floating the sections on 1% aqueous phosphotungstic acid (PTA). POM blends were not stained but the sections were coated with carbon in a vacuum evaporator to improve beam stability. Images were obtained using a JEOL 1200 EX TEM operated at 100 KV accelerating voltage and recorded on sheet film. DMA measurements were performed by ASTM Method 4065 with a torque force of 1.2–1.4 N m. The bar was scanned in 3 Hz at 3° C./min rate from 140° C. to 220° C. The oscillation amplitude was 10 µm.

Experiment 1

Preparation of MBL Homopolymer

A solution of 200 g of MBL, 1 g AIBN and 1080 µL of ethyl acrylate and 1250 µL of lauryl mercaptan was sparged with $N_2$ for 5 min. The solution was heated in a sealed polymerization tube at 60° C. for 6 h. The tube was cooled and DMSO was added to dissolve the polymer. The DMSO solution was added dropwise to methanol and the polymer precipitate was collected on a filter. The polymer was extracted with hot water in a Soxhlet apparatus for 8 h and dried in a vacuum oven at 150° C. overnight. The Tg was 187° C.

Experiment 2

Preparation of MBL/MMA (70/30) Copolymer

A 500 ml feed flask was charged with 700 g of GBL solvent, 210 g MBL, 90 g MMA and 1.5 g lauryl mercaptan. This mixture (150 ml) was added to a 2 L jacketed reactor and was heated to 60° C. with a circulating water bath. AIBN (1.5 g) was charged and the mixture was stirred for 15 min. The monomer/solvent/mercaptan mix was metered in slowly at a rate of 5 g/h. After the addition was complete (157 min), the reaction was stirred for 1 h and the temperature was then raised to 90° C. and continued heating for 2 more h. The reaction mixture was cooled and slowly added to 2.5 L of methanol under fast high shear stirring. The polymer powder was collected on a Buchner filter funnel and dried in a vacuum oven at 210° C. for 3 d. The Mn was 31,600, with a Mw/Mn of 2.00. The polymer has a Tg of 145° C.

Experiment 3

Preparation of MBL/HEMA (95/5) Copolymer

A 1000 mL 3-necked flask equipped with a mechanical stirrer, reflux condenser, and rubber stopper was charged with 250 mL NMP and heated to 90° C. A mixture of MBL (95 g, 0.97 mol), 2-hydroxyethyl methacrylate (5 g, 0.038 mol) and AIBN (100 mg, 0.61 mmol) was added dropwise over 4 h (via mechanical pump) while maintaining the temperature at 80° C. After complete addition, the temperature was raised to 115° C. and held for 3 h. The viscous mixture was then diluted with 200 mL DMAC and precipitated dropwise into 4500 mL of methanol. The white polymer precipitate was collected via filtration, washed with water, and dried in a vacuum oven at 150° C. overnight. Yield 85 g (85%). Molecular weight by GPC was Mn 91,300, Mw/Mn was 11.2. Tg 175° C. (by DSC, $N_2$, 20° C./min.).

Control 1

Homopolymer of MBL

We have been unable to obtain a Notched Izod result for the poly-MBL on samples made by compression molding because they crack in the upon taking samples out of the molds after compression molding.

Control 2

Homopolymer of MBL

Samples of completely transparent polyMBL (bulk polymerized using a cell casting process, Mn of 126,500, Mw/Mn was 2.07) was cut with a laser cutter and had a Notched Izod of 11.7 Nm/m.

Example 1

MBL homopolymer (25 g) and a particle toughener with an acrylic core (Paraloid® 3361, 25 g) were mixed in a Brabender® apparatus at 250° C., at 100 rpm under nitrogen for 5 min. Samples for impact testing were compression molded at 250° C., at 276 MPa with a 15 ml pre-heat and 10 ml press time. A plaque molded at 250° C., at 276 MPa, with a 15 min preheat and 10 min press time was obtained which was visually not transparent. The result for the Notched Izod was 28.8 Nm/m.

Example 2

MBL homopolymer (Experiment 1, 25 g) and a particle toughener with a butadiene/styrene core (Paraloid® BTA 730 L, 25 g) were mixed in a Brabender® mixer at 250° C. at 60 rpm under nitrogen for 5 min. Samples for impact testing were compression molded at 250° C., at 241 MPa, with a 10 min pre-heat and 10 min press time. The notched Izod was 10.7 Nm/m. The sample was slightly yellow and somewhat transparent. Haze was 57.1%, transmission 73.9%. The Tg after toughening was 190° C.

Example 3

MBL homopolymer (prepared similar to Experiment 2, 25 g) and a particle toughener with an acrylic core (Paraloid® KM 334, 25 g) were mixed in a Brabender® mixer at 250° C. at 100 rpm under nitrogen for 10 min. Samples for impact testing were compression molded at 250° C., at 241 MPa, with a 10 min pre-heat and 5 min press time. The notched Izod was 82.2 Nm/m. The sample was completely non-transparent.

Example 4

MBL homopolymer (prepared similar to Experiment 2, 25 g) and a particle toughener with an acrylic core (Paraloid® KM 365, 25 g) were mixed in a Brabender® mixer at 250° C. at 100 rpm under nitrogen for 10 min. Samples for impact testing were compression molded at 250° C., at 241 MPa, with a 10 min pre-heat and 5 min press time. The notched Izod was 107.3 Nm/m. The sample was completely non-transparent.

Example 5

MBL homopolymer (prepared similar to Experiment 1, 25 g) and a particle toughener with a 1,3-butadiene/styrene core (Paraloid® BTA 730L, 25 g) were mixed in a Brabender® mixer at 250° C. at 100 rpm under nitrogen for 10 min. Samples for impact testing were compression molded at 250° C., at 241 MPa, with a 10 min pre-heat and 5 min press time. The notched Izod was 55.0 Nm/m. The sample was yellow and somewhat transparent. Haze was 66.9%, transmission 74.5%.

Example 6

A copolymer (90/10 MBL/MMA made in a similar fashion to Experiment 2, 40 g) and Paraloid® BTA 730L (10 g) were mixed in a Brabender® mixer at 220° C. and 100 rpm under nitrogen for 6 min. Samples for impact testing were compression molded at 220° C., at 241 MPa, with a 10 min pre-heat and 2 min press time. The notched Izod was 35.8 Nm/m.

Example 7

A copolymer (60/40 MBL/MMA, made in a similar fashion to Experiment 2, 40 g) and 10 g of Paraloid® BTA 730L were mixed in a Brabender® mixer at 220° C. and 100 rpm under nitrogen for 6 min. Samples for impact testing were compression molded at 220° C., at 241 MPa, with a 10 min pre-heat and 2 min press time. The notched Izod was 38.4 Nm/m.

Example 8

A copolymer (70/30 MBL/MMA as made in Experiment 2, 190 g) and Paraloid® BTA 730L (190 g) were mixed in a 16 mm twin screw extruder, Welding Engineers Model TSE 16TC, at 230° C. with a throughput of about 1.4 kg/h. The polymer strand was air cooled and pelletized. The Tg had increased slightly to 166° C. Samples for impact testing were compression molded at 220° C., at 241 MPa, with a 10 min preheat and 2 min press time. The sample was slightly yellow and somewhat transparent (haze=80.0%, transmission 82.8%). The notched Izod was 58.2 Nm/m.

Control 3 and Example 9

An ethylene/28 wt % n-butyl acrylate/5.25 wt % glycidyl methacrylate (EBAGMA) copolymer with an MBL-based resin were mixed for 5 min using a Haake® mixer at a set temperature of 210° C. and 100 rpm for 5 min. Results are given in Table 2.

Examples 10–11

The EBAGMA copolymer was blended with an MBL copolymer as made in Experiment 3 using a Brabender® mixer with a set temperature of 230° C. at 100 rpm for 5 min. Samples for impact testing were compression molded at 230° C. at 241 MPa, with a 10 min pre-heat and 2 min press time. Both samples were not transparent. Results are given in Table 2.

TABLE 2

|  | Control 3 | Example 9 | Example 10 | Example 11 |
|---|---|---|---|---|
| Material (wt. %) | | | | |
| EBAGMA | 19.8 | 19.8 | 10.0 | 30.0 |
| MBL homopolymer | 80.0 | 0 | 0 | 0 |
| MBL/10 wt % MAA[a] | 0 | 80.0 | 0 | 0 |
| MBL/5 wt % HEMA[b] | 0 | 0 | 90.0 | 70.0 |
| Irganox ® 1010 | 0.2 | 0.2 | 0.0 | 0.0 |
| Notched Izod, Nm/m | 16.0 | 42.7 | 98.8 | 41.1 |

[a]Polymer was made in a fashion similar to Experiment 2.
[b]See Experiment 3.

Experiment 4

Preparation of MBL/MMA (70/30) Copolymer

A 2 L feed flask was charged with 700 g of GBL solvent, 210 g MBL, 90 g MMA and 1.5 g lauryl mercaptan. Part of this mixture (150 ml) was added to a 2 L jacketed reactor and was heated to 60° C. with a circulating water bath. AIBN (1.5 g) was charged and the mixture was stirred for 15 min. The monomer/solvent/mercaptan mix was metered in slowly at a rate of 5 g/min. After the addition was complete (157 min), the reaction was stirred for 1 h and the temperature was then raised to 90° C. and continued heating for 2 more h. The reaction mixture was cooled and slowly added to 2.5 L of methanol under fast high shear stirring. The polymer powder was collected on a Buchner filter funnel and dried in a vacuum oven at 210° C. for 3 d. The Mn was 31,600, with a Mw/Mn of 2.00. The polymer has a Tg of 145° C.

Experiment 5

Synthesis of MBL Homopolymer

A 2 L feed flask was charged with 1140 g MBL, 60 g n-butyl acrylate, 6 g of AIBN and 6 g lauryl mercaptan. A 5

L jacketed reactor containing 3378 g of butyrolactone was heated to with a circulating water bath to 84° C. The monomer/initiator/mercaptan mix was metered in slowly at a rate of 6.7 g/min. After the addition was complete (207 min), the reaction was stirred for 2 h. The reaction mixture was cooled and slowly added to 14 L of methanol under fast high shear stirring. The polymer powder was collected on a Buchner filter funnel and dried in a vacuum oven at 210° C. for 4 d. The Mn was 118,100, with a Mw/Mn of 1.61.

Examples 12–18

MBL/MMA (70/30)polymer Blends with 16 mm Extruder

The MBL/MMA copolymer of Experiment 4 was ground to a fine powder and mixed in a 20:80 weight ratio with 8 different matrix resins (each ground to a powder and dried in a vacuum oven). A 16 mm extruder was heated to 200° C. and each of the matrix resins were extruded followed by 0.45 kg. of the MBL powder blend. Table 3 shows the order in which the polymers were extruded, the feed rate and the temperature of the last two zones of the extruder, as well as the Tg and particle size of the dispersed MBL copolymer. The polymer strand was quenched in water and pelletized.

TABLE 3

| Ex. | Resin | Feed rate (kg/hr) | Barrel Temp (° C.) | Tg (° C.) ASTM D3418 | Particle Size, μm TEM |
|---|---|---|---|---|---|
| 12 | POM | 1.4–1.8 | 200 | — | Up to 7x22 |
| 13 | SAN | 1.8–2.3 | 230 | 106 | 0.07–3 |
| 14 | PBT | 1.6–2.7 | 250 | — | 0.14–3.7 |
| 15 | Nylon 6 | 2.3 | 240 | 52 | 0.03–3.9 |
| 16 | PET | 1.8–2.3 | 270 | 85 | 0.17–1.7 |
| 17 | LCP | 1.6–2.7 | 270 | — | 0.5–5 |
| 18 | nylon-6,6 | 1.8–2.5 | 270 | — | 0.7x0.7 |

Examples 25–31

MBL Polymer Blends with 30 mm Extruder

Several batches of MBL containing polymers were prepared similar to Experiments 4 and 5 were combined: 2000 g of MBL homopolymer, 600 g of a 70/30 copolymer of MBL and MMA, and 1000 g of a 50/50 copolymer of MBL and MMA. Each of these polymers also had 2 wt % ethyl acrylate. The combined polymer sample was added to the rear of a 30 mm co-rotating twin screw extruder with intermeshing screws. The screw design used two sets of kneading blocks followed by reverse elements for two working zones. The average composition of the MBL polymer was 70% MBL, 30% MMA with Tg=164° C. This powder was co-fed in the extruder with three different matrix resins: POM, PBT, and nylon 6,6. The feed rates were adjusted so that a final blend of 40% MBL polymer with the matrix resins. The barrels were set to 210° C. for the POM, 240° C. for the PBT, and 290° C. for the nylon 6,6, the POM was run at 200 rpm and 9.1 kg per hour, the PBT at 300 rpm and 9.1 kg per hour, and the nylon at 300 rpm and 13.6 kg per hour. The blends and controls (no MBL copolymer) were molded on a 170 g (6 oz) Van Dorn reciprocating screw injection molding machine using a 90° C. mold temperature and a 25 sec screw retraction/25 sec screw forward time cycle at maximum pressure without flashing the mold. The mold had one 3.2 mm (thick) tensile bar and two 3.2 mm flex bar cavities. The barrel settings were 190° C. for the POM, 240° C. for the PBT, and 270° C. for the nylon 6,6. Results of the polymer testing are given in Table 4.

TABLE 4

| Ex. | MATRIX | % | Particle size (TEM) μm | F.M. DAM GPa | T.S. DAM MPa | % E DAM | IZOD DAM Nm/m | HDT ° C. |
|---|---|---|---|---|---|---|---|---|
| Control 6 | POM | 100 | | 2.55 | 68.9 | 47 | 389 | 96 |
| 19 | POM | 70 | 0.14–5 | 3.21 | 60.0 | 5 | 206 | 112 |
| Control 7 | PBT | 100 | | 2.37 | 52.4 | 197 | 239 | 52 |
| 20 | PBT | 60 | 0.1–8 | 3.50 | 51.7 | 3 | 163 | 102 |
| 21 | PBT | 60* | 0.1–8 | 3.44 | 48.9 | 3 | 156 | 103 |
| Control 8 | Nylon 6,6 | 100 | | 2.90 | 82.7 | 36 | 267 | 72 |
| 22 | Nylon 6,6 | 60 | 0.04–2.5 | 3.75 | 76.5 | 4 | 187 | 105 |

*0.05% Zn(OAc)$_2$ added.

Experiment 6

Preparation of MBL/n-butyl Acrylate Copolymer

A 500 mL 3 neck flask equipped with a mechanical stirrer, reflux condenser, and rubber stopper was charged with 100 mL NMP and heated to 90° C. A mixture of MBL (84 g), n-butyl acrylate (22 g), and AIBN (0.36 g) was added dropwise over 2–3 h (via mechanical pump) while maintaining the temperature at 90° C. After complete addition, the temperature was raised to 110° C. and held for 3 h. The viscous mixture was then diluted with 250 mL NMP and precipitated dropwise into 1500 mL of methanol. The white polymer precipitate was collected via filtration, washed with methanol (Soxhlet extractor) and dried in a vacuum oven at 100° C. overnight. Yield 71 g (67%). Molecular weight; Mn 37,600, Mw 65,300, IV 0.869 (HFIP); DSC; Tg 137° C.

Examples 23–24

Preparation of Poly-(MBL-co-n-butyl acrylate)/polycarbonate Blends

The polymer prepared in Experiment 6 was blended with Lexan® 134 polycarbonate in varying proportions (about 50 g total polymer) in a Brabender® mixer. Mixing conditions: RPM=50, set temperature=220° C., melt temperature=228° C., torque=3000, mixing time=5 min. Properties of the blends are shown in Table 5.

TABLE 5

| Ex. | Polycarbonate/polyMBL-co-nBA (by weight) | Appearance | Tg (° C.) |
|---|---|---|---|
| Control 9 | 100/0 | Transparent | 150 |
| 23 | 75/25 | transparent, water white | 147 |

TABLE 5-continued

| Ex. | Polycarbonate/polyMBL-co-nBA (by weight) | Appearance | Tg (° C.) |
|---|---|---|---|
| 24 | 50/50 | transparent, water white | 143 |
| Control 10 | 0/100 | Transparent | 137 |

Examples 25–31

MBL Polymer Blends with 16 mm Extruder

The MBL polymer of Experiment 5 was ground to a fine powder and mixed in a 20:80 weight ratio with 8 different matrix resins (each ground to a powder and dried in a vacuum oven). A 16 mm extruder was heated to 200° C. and each of the matrix resins were extruded followed by 0.45 kg. of the MBL powder blend. Table 6 shows the order in which the polymers were extruded, the feed rate and the temperature of the last two zones of the extruder, as well as the Tg, storage modulus, E', and particle size of the dispersed MBL copolymer. The polymer strand was quenched in water and pelletized. Table 6 shows two characteristics of the 20% MBL blends with a variety of polymers.

TABLE 6

| Ex. | Resin | Feed rate (kg/hr) | Barrel Temp (° C.) | Tg (° C.) DMA | E' @ 25° C. (GPa) | Particle Size, μm TEM |
|---|---|---|---|---|---|---|
| 25 | POM | 1.4–1.8 | 200 | −59 | 1.2 | Up to 6.5 |
| 26 | SAN | 1.8–2.3 | 230 | 98 | 1.5 | 0.07–6.5 |
| 27 | PBT | 1.6–2.7 | 250 | 54/189 | 2.0 | 0.14–10 |
| 28 | Nylon 6 | 2.3 | 240 | 39/188 | 1.8 | 0.07–3.3 |
| 29 | PET | 1.8–2.3 | 280 | 84/187 | 2.9 | 0.07–2.7 |
| 30 | LCP | 1.6–2.7 | 280 | — | — | 0.2–3 |
| 31 | nylon-6,6 | 1.8–2.5 | 280 | 63/189 | 2.8 | 0.07–3.6 |

What is claimed is:

1. A composition, comprising:
   (a) a first polymer comprising the repeat units:
      (i) at least about 10 mole percent of the total repeat units of

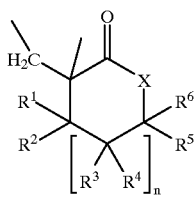

(I)

(ii) at least about 0.1 mole percent of a repeat unit containing a first reactive functional group;
   (iii) up to about 89.9 mole percent of repeat units derived from one or more monomers which are free radically copolymerizable with (a)(i) and (a)(ii); and
(b) about 1 weight percent to about 50 weight percent based on the total weight of (a) and (b), of a second polymer which is elastomeric and contains a second reactive functional group which may react with said first reactive functional group; or (c) a third polymer comprising the repeat units
   (i) at least about 10 mole percent of the total repeat units of

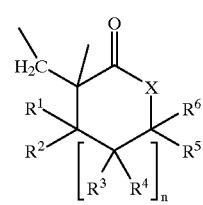

(I)

(ii) up to about 90 mole percent of repeat units derived from one or more monomers which are free radically copolymerizable with (b)(i); and
(d) about 1 percent by weight to about 60 percent by weight based on the total weight of (c) and (d), of a fourth polymer which is core-shell particles made up of an elastomeric polymer core and a polymeric thermoplastic shell, said thermoplastic shell comprising repeat units derived from methyl methacrylate;

wherein:
   n is 0, 1 or 2;
   X is —O— or —NR$^9$—; and
   R$^1$, R$^2$, R$^5$, R$^6$, R$^9$, each of R$^3$, and each of R$^4$, are independently hydrogen, hydrocarbyl or substituted hydrocarbyl.

2. The composition as recited in claim 1 wherein R$^1$, R$^2$, R$^3$, R$^4$, R$^5$ and R$^6$ are all independently hydrogen or alkyl containing 1 to 6 carbon atoms, and X is oxygen.

3. The composition as recited in claim 2 wherein n is 0.

4. The composition as recited in claim 3 wherein R$^1$, R$^2$, R$^3$, R$^4$, R$^5$ and R$^6$ are all hydrogen.

5. The composition as recited in claim 4 wherein (a)(iii) or (c)(ii) are derived from one or more of

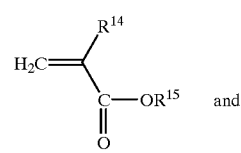

(V)

and

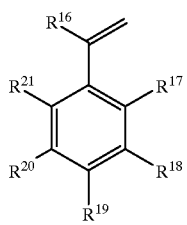

(VI)

wherein $R^{14}$ is hydrogen or methyl, $R^{15}$ is hydrocarbyl or substituted hydrocarbyl, and $R^{16}$ is hydrogen or methyl, and $R^{17}$, $R^{18}$, $R^{19}$, $R^{20}$ and $R^{21}$ are each independently hydrogen, hydrocarbyl substituted hydrocarbyl or a functional group.

6. The composition as recited in claim 4 which comprises said first and said second polymers, wherein said first and second polymer contain one of an epoxy, carboxylic anhydride, isocyanato, hydroxyl, amino or carboxyl group.

7. The composition as recited in claim 6 wherein said first polymer contains about 0.1 to about 25 mole percent of repeat unit (a)(ii), and said second polymer contains about 0.01 to about 1.5 moles of second reactive group per kg of said second polymer.

8. The composition as recited in claim 6 wherein said second polymer is a copolymer of ethylene, an alkyl acrylate and glycidyl acrylate or methacrylate.

9. The composition as recited in claim 4 which comprises said third and fourth polymers, and said fourth polymer is a core-shell polymer in which at least 50 mole percent of the repeat units in said shell are derived from methyl methacrylate.

10. The composition as recited in claim 9 wherein said core is elected from the group consisting of poly(1,3-butadiene-co-styrene) and an alkyl acrylate wherein said alkyl contains 2 to 4 carbon atoms.

11. The composition as recited in claim 4 which comprises said third and fourth polymers and is transparent, as measured by ASTM Method D1003.

12. The composition as recited in claim 1 wherein (a)(iii) or (c)(ii) are derived from one or more of

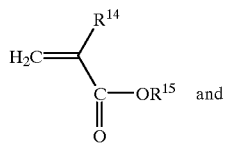

and

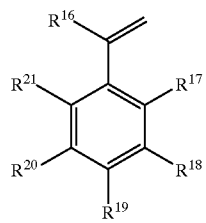

(VI)

wherein $R^{14}$ is hydrogen or methyl, $R^{15}$ is hydrocarbyl or substituted hydrocarbyl, and $R^{16}$ is hydrogen or methyl, and $R^{17}$, $R^{18}$, $R^{19}$, $R^{20}$ and $R^{21}$ are each independently hydrogen, hydrocarbyl substituted hydrocarbyl or a functional group.

13. The composition as recited in claim 1 wherein (a)(iii) or (c)(ii) are derived from methyl methacrylate and optionally other copolymerizable monomers.

14. The composition as recited in claim 1 which comprises said first and said second polymers, wherein said first and second polymers contain one of an epoxy, carboxylic anhydride, isocyanato, hydroxyl, amino or carboxyl group.

15. The composition as recited in claim 14 wherein said first polymer contains about 0.1 to about 25 mole percent of repeat unit (a)(ii), and said second polymer contains about 0.01 to about 1.5 moles of second reactive group per kg of said second polymer.

16. The composition as recited in claim 14 wherein said second polymer is a copolymer of ethylene, an alkyl acrylate and glycidyl acrylate or methacrylate.

17. The composition as recited in claim 1 which comprises said third and fourth polymers, and said fourth polymer is a core-shell polymer in which at least 50 mole percent of the repeat units in said shell are derived from methyl methacrylate.

18. The composition as recited in claim 17 wherein said core is selected from the group consisting of poly(1,3-butadiene-co-styrene) and an alkyl acrylate wherein said alkyl contains 2 to 4 carbon atoms.

19. The composition as recited in claim 1 which comprises said third and fourth polymers and is transparent, as measured by ASTM Method D1003.

\* \* \* \* \*